US005802965A

United States Patent [19]

Lin

[11] Patent Number: 5,802,965

[45] Date of Patent: Sep. 8, 1998

[54] BEAN SPROUT PROCESSING APPARATUS

[76] Inventor: Pao-Tseng Lin, No. 40, Alley 2, Lane 787, Chung Cheng Road, Chung Li City, Taiwan

[21] Appl. No.: 802,055

[22] Filed: Feb. 19, 1997

[51] Int. Cl.[6] ................................ A23L 1/00; A23L 1/34; B08B 3/02; B08B 3/06

[52] U.S. Cl. ................................ 99/517; 99/546; 99/601; 99/635; 99/637; 209/629; 209/685

[58] Field of Search ............................. 99/506, 516, 517, 99/539–546, 601–618, 635–643, 470; 209/260, 270, 173, 700, 931, 617, 620, 629, 685

[56] References Cited

U.S. PATENT DOCUMENTS

| | | | |
|---|---|---|---|
| 3,589,515 | 6/1971 | Krolopp et al. | 209/617 |
| 3,731,797 | 5/1973 | Tanner | 209/700 |
| 3,861,293 | 1/1975 | Buffa et al. | 99/484 |
| 3,909,291 | 9/1975 | Leong | 99/518 |
| 4,009,783 | 3/1977 | Park | 209/617 |
| 4,223,688 | 9/1980 | Nylund et al. | 99/567 |
| 4,385,702 | 5/1983 | Lenker et al. | 209/629 |
| 4,446,781 | 5/1984 | Schmitt | 99/517 |
| 4,478,141 | 10/1984 | Svensson et al. | 99/517 X |
| 4,667,590 | 5/1987 | Balaam et al. | 99/470 |
| 4,682,613 | 7/1987 | DeLoach | 209/260 X |
| 5,305,688 | 4/1994 | Kotani et al. | 99/470 X |
| 5,429,248 | 7/1995 | Le Gigan et al. | 209/390 X |

*Primary Examiner*—Timothy F. Simone
*Attorney, Agent, or Firm*—Notaro & Michalos PC

[57] ABSTRACT

A bean sprouts processing apparatus includes a feeding section, a treating section and a separating section arranged in sequence substantially in a horizontal manner. The feeding section includes a receptacle for receiving un-processed bean spouts therein and a conveyor for conveying the bean sprouts to the treating section. The treating section has a sprout tray movably supported on a base with a shaking device arranged between the sprout tray and the base to shake the sprout tray relative to the base so as to separate husks from the sprouts and to break roots of the sprouts and also move the sprouts and the separated husks and broken roots toward the separating section. A cooling device is optionally mounted on the base of the treating section to lower the temperature of the sprouts down to about 3°–5° C. The separating section has a sprout support plate movably supported on a base to receive the sprouts from the treating section. The sprout support plate has a plurality of apertures formed thereon. The separating section further includes a vibration device arranged between the base and the sprout support frame to vibrate the sprout support plate relative to the base so as to cause the husks and broken roots to fall through the apertures and thus separated from the sprouts.

12 Claims, 6 Drawing Sheets

BEAN SPROUT PROCESSING APPARATUS

FIELD OF THE INVENTION

The present invention relates generally to an apparatus for processing bean sprouts, such as green lentils, including separating the husks from the beans, breaking the roots of the beans and cooling the bean sprouts to a suitable low temperature for improved preservation of the bean sprouts, without causing any serious damage to the bean sprouts.

BACKGROUND OF THE INVENTION

In the processing of bean sprouts, such as sprouts of green lentils, the husks of the green lentils have to be removed from the sprouted green lentils and the growing ends of the roots have to be cut or broken and removed in order to become an acceptable vegetable. Conventionally, a drum type device is used to process the bean sprouts which needs a great quantity of fresh water to flush away the separated husks and broken roots and the device has to be manually cleaned periodically. Further, the bean sprouts that are so processed may need to be dehydrated by means of a centrifugal dehydration device. Disadvantages associated with such a conventional drum type bean sprout device are that (1) the dehydrating operation increases the cost of processing, (2) using water to flush away the husks and the broken roots increases the overall cost and consumes a great amount of water resources, and (3) using water to clean the husks and the broken roots wets the bean sprouts which may in turn cause damage to the sprouts and deteriorates the preservability of the processed bean sprouts.

To overcome the conventional wet processing manner of the drum type bean sprout processing device, the present applicant discloses a vertical type bean processing apparatus in Taiwan patent application No. 83218319. The vertical bean processing apparatus has a height of approximately three meters which causes difficult in cleaning the apparatus. The great height may also cause damage to the bean sprouts in travelling through such a fall. Further, such a huge and high apparatus can only process the bean sprouts at a rate of two tons per hour, a capacity only slightly greater than the conventional drum type processing device. Moreover, a large fan is needed in such a vertical type bean sprout processing apparatus which cause great noise in operation.

It is thus desirable to provide a bean processing apparatus which overcomes the drawbacks of the conventional bean sprout processing devices and increases the throughput without any significant damage to the bean sprout and lengthens the preservation period of the so processed bean sprouts.

SUMMARY OF THE INVENTION

The principal object of the present invention is to provide a bean sprout processing apparatus which does not need to consume water for separating the husks and the broken roots from the bean sprouts and which is substantially arranged in a horizontal manner so as to reduce the damages to the bean sprouts during the processing operation.

Another object of the present invention is to provide a bean sprout processing apparatus wherein a low temperature air stream is supplied to the bean sprouts to lower down the temperature of the bean sprouts for improved preservation of the bean sprouts.

A further object of the present invention is to provide a bean sprout processing apparatus having a significantly increased working capacity.

To achieve the above object, in accordance with the present invention, there is provided a bean sprouts processing apparatus comprising a feeding section, a treating section and a separating section arranged in sequence substantially in a horizontal manner. The feeding section comprises a receptacle for receiving un-processed bean spouts therein and a conveyor for conveying the bean sprouts to the treating section. The treating section comprises a sprout tray movably supported on a base with a shaking device arranged between the sprout tray and the base to shake the sprout tray relative to the base so as to separate husks from the sprouts and to break roots of the sprouts and also move the sprouts and the separated husks and broken roots toward the separating section. A cooling device is optionally mounted on the base of the treating section to lower the temperature of the sprouts down to about 3°–5° C. The separating section comprises a sprout support plate movably supported on a base to receive the sprouts from the treating section. The sprout support plate has a plurality of apertures formed thereon. The separating section further comprises a vibration device arranged between the base and the sprout support frame to vibrate the sprout support plate relative to the base so as to cause the husks and broken roots to fall through the apertures and thus separated from the sprouts.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
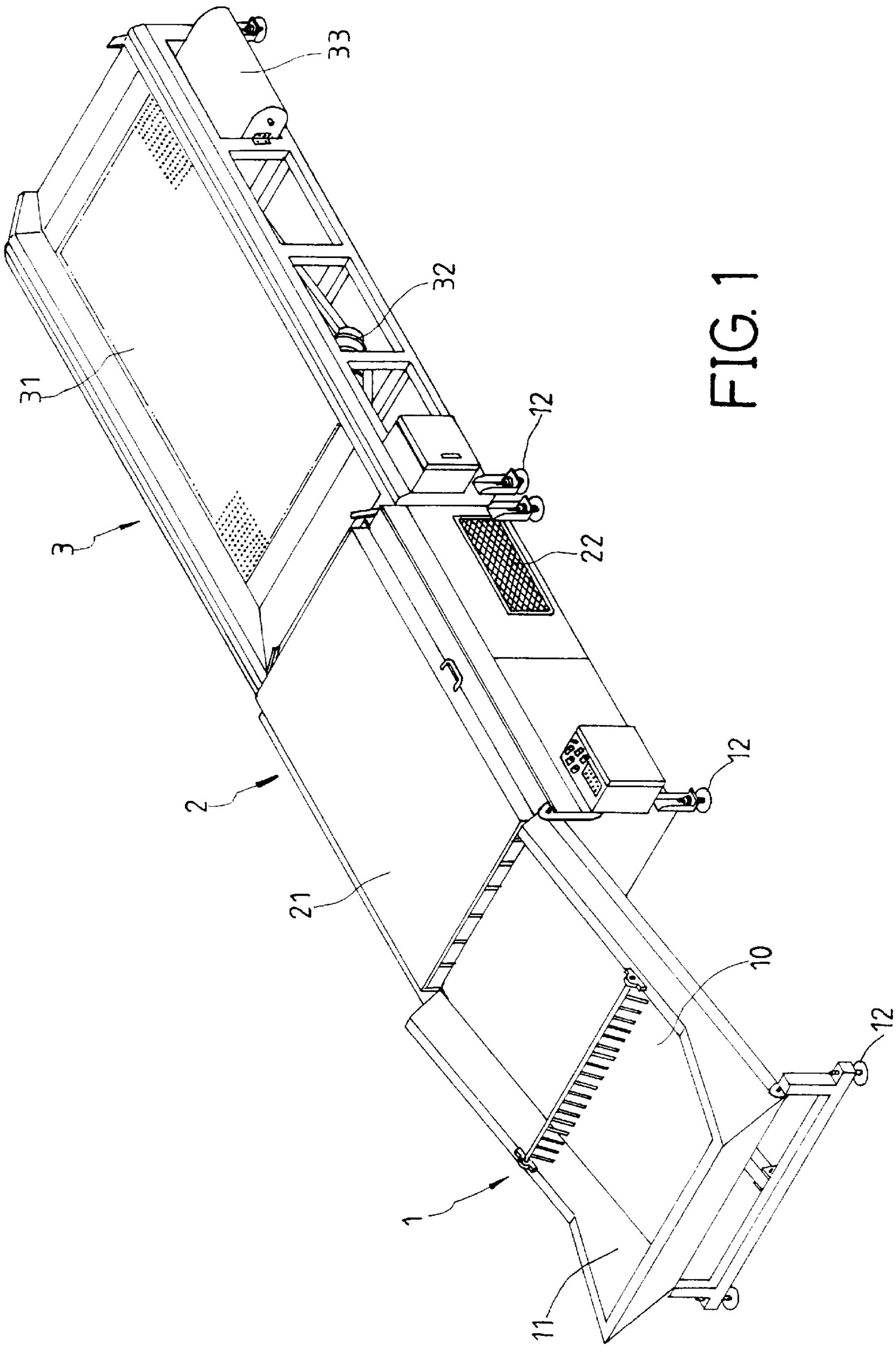
FIG. 1 is a perspective view showing a bean sprout processing apparatus in accordance with the present invention.

With reference to the drawings and in particular to FIG. 1, wherein a bean sprout processing apparatus constructed in accordance with the present invention for processing bean sprouts, such as green lentil sprouts which is taken as an example in the description of the present invention, is shown, the bean sprout processing apparatus of the present invention comprises a feeding section 1, a husk removing and root breaking section 2 and a vibration separating section 3 which are arranged in a line in sequence substantially in a horizontal plane.

The feeding section 1 comprises mainly a conveyor, such as a belt conveyor 10, which is upward inclined to convey un-processed bean sprouts from a receptacle 11 to the husk removing and root breaking section 2. Adjustable supports 12 may be provided to adjust the orientation and position of the conveyor 10. Similar adjustable supports 12 are also provided to the husk removing and root breaking section 2 and the vibration separating section 3 for height adjustment.

Figure 2:
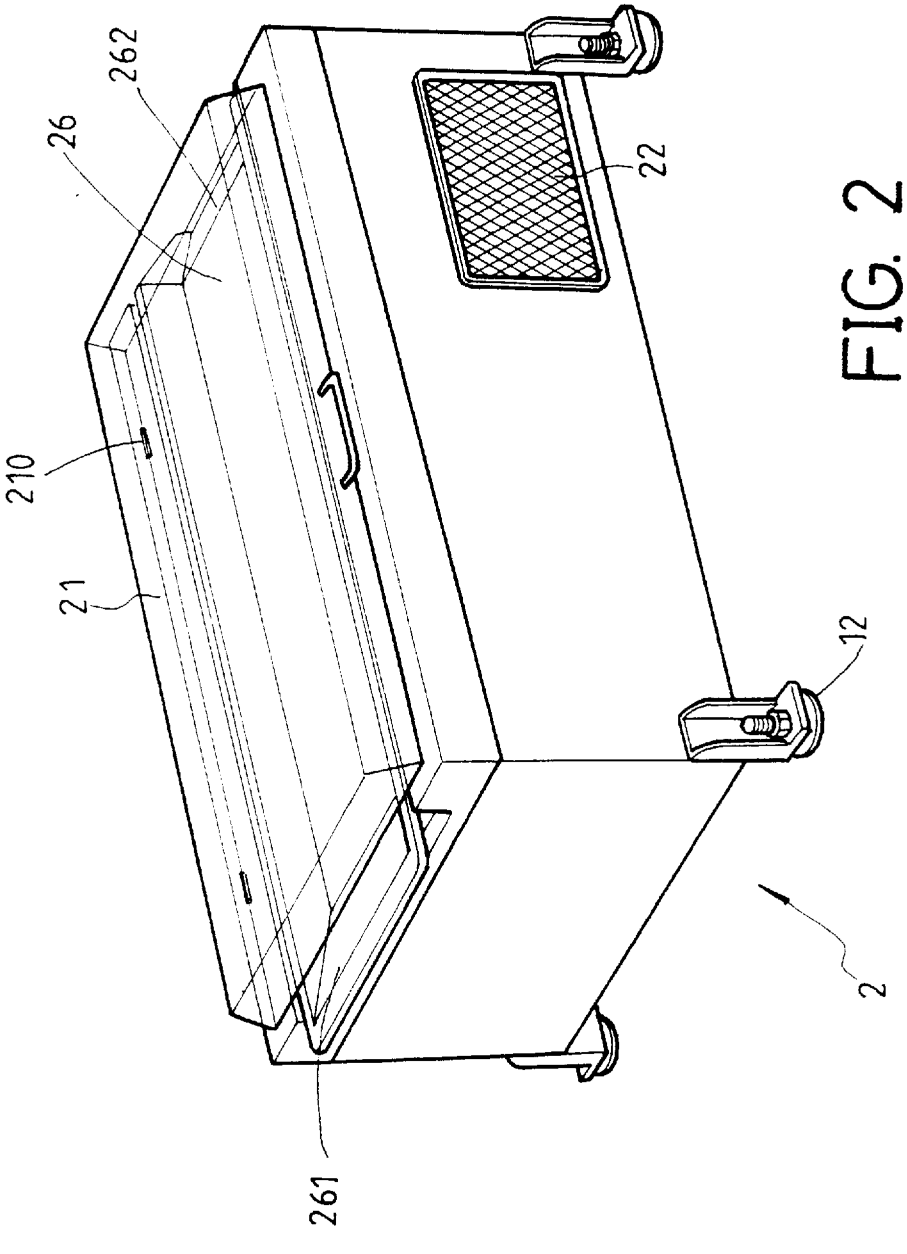
FIG. 2 is a perspective view showing the husk removing and root breaking section of the bean sprout processing apparatus of the present invention.
Figure 3:
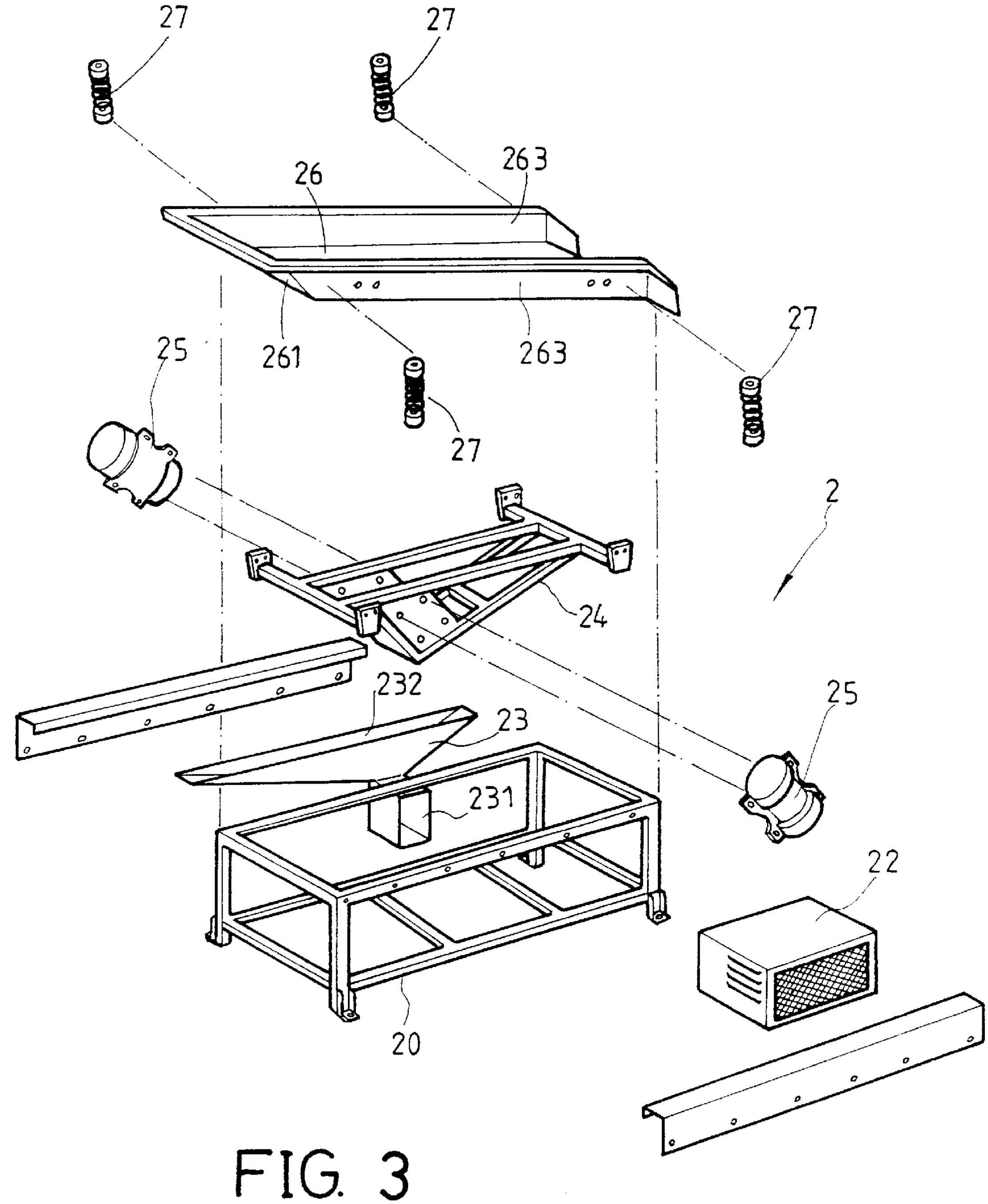
FIG. 3 is an exploded perspective view of the husk removing and root breaking section.
Figure 4:
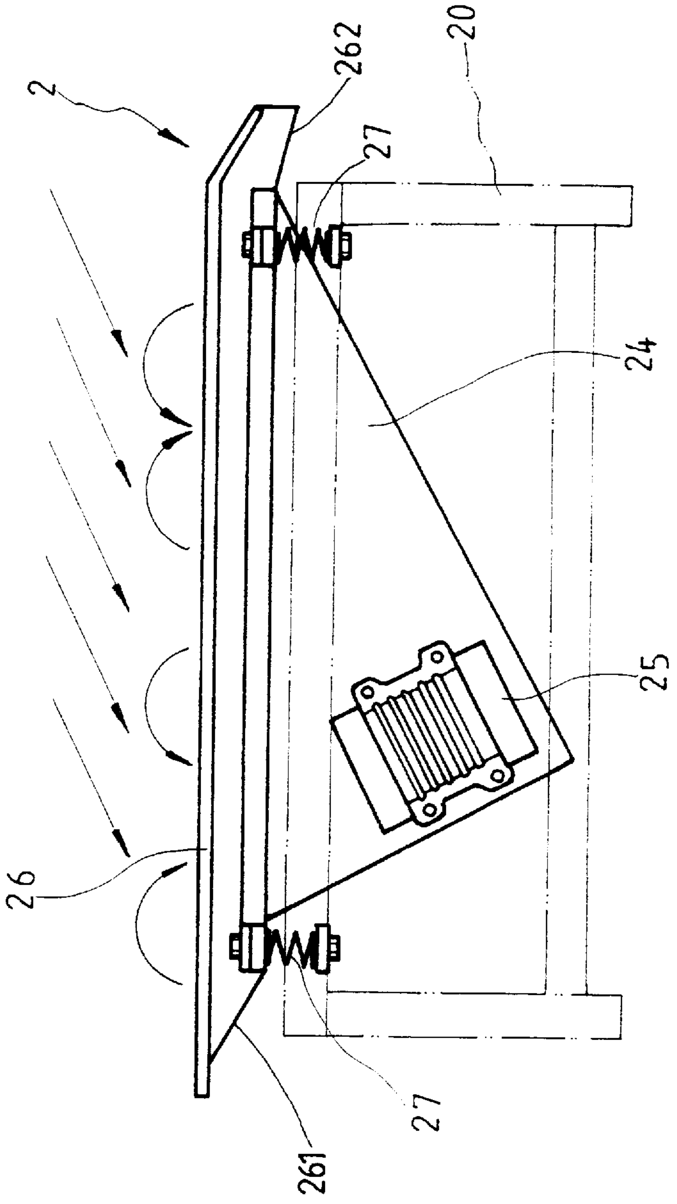
FIG. 4 is a side elevational view of the husk removing and root breaking section.

With further reference to FIGS. 2, 3 and 4, the husk removing and root breaking section 2 which is located downstream of the feeding section 1 comprises a base frame 20 on which a sprout tray 26 is movably supported. Shaking means is arranged between the base frame 20 and the sprout tray 26 to movably support the sprout tray 26 on the base frame 20. The shaking means comprises a shaking frame 24 supported on the base frame 20 with resilient means, such as springs 27. In the embodiment illustrated, both the base frame 20 and the shaking frame 24 are rectangular in shape in top plan view and four springs 27 are provided at four corners thereof to resiliently and thus movably support the shaking frame 24 on the base frame 20. The shaking means further comprises at least one eccentric motor 25, preferably two as shown in the drawings, mounted on the shaking frame 24 in an eccentric manner and the shaking frame 24 is constructed to have a gravity center offset from a geometrical center thereof, defining an un-balanced gravity center, preferably in the form of an un-equilateral triangle, so that by the operation of the motors 25, the shaking frame 24 moves reciprocally or shakes. Such a way of shaking or reciprocation is known so that no explanation is needed.

Preferably, the sprout tray 26 is located at a height slightly lower than the outlet point of the conveyor 10 and comprises a first inclination 261 formed on the entrance thereof to conduct the un-processed bean sprouts from the outlet of the conveyor 10 into the tray 26.

The sprout tray 26 is fixed on the shaking frame 24 so that when the motors 25 are actuated to oscillate or reciprocally move the shaking frame 24, the sprout tray 26 is shaken. The shaking operation helps separating the husks from the sprouted green lentils (not shown) and breaking the lentil roots.

The shaking of the sprout tray 26 also serves to move the bean sprouts toward an exit of the tray 26 preferably on which an inclination 262, see FIG. 2, is provided to help moving the sprouts into the vibration separating section 3. Preferably, the sprout tray 26 is provided with two opposite side walls 263 along two opposite sides of the tray 26 to guide the sprouts toward the exit inclination 262.

A cover 21 is provided to openably cover the sprout tray 26. The cover 21 is pivoted to one side of the sprout tray 26 by means of for example hinges 210, see FIG. 2. The cover 21 may be controlled manually or by means of power device, such as hydraulic or pneumatic actuator (not shown).

Low temperature treating device is provided to cool or lower down the temperature of the bean sprouts. Preferably, the temperature of the bean sprouts is lowered down to approximately 3°–5° C. at which the sprouts become hibernated and the preservation thereof will be significantly improved. The low temperature treating device comprises a cooling source 22 which is mounted on the base frame 20 and generates a low temperature air stream. The low temperature air stream is conducted to a distributor 23 through an inlet piping or passageway 231. The low temperature air stream is then distributed in a substantially uniform manner to the bean sprouts on the sprout tray 26 through a diverging outlet 232.

Figure 5:
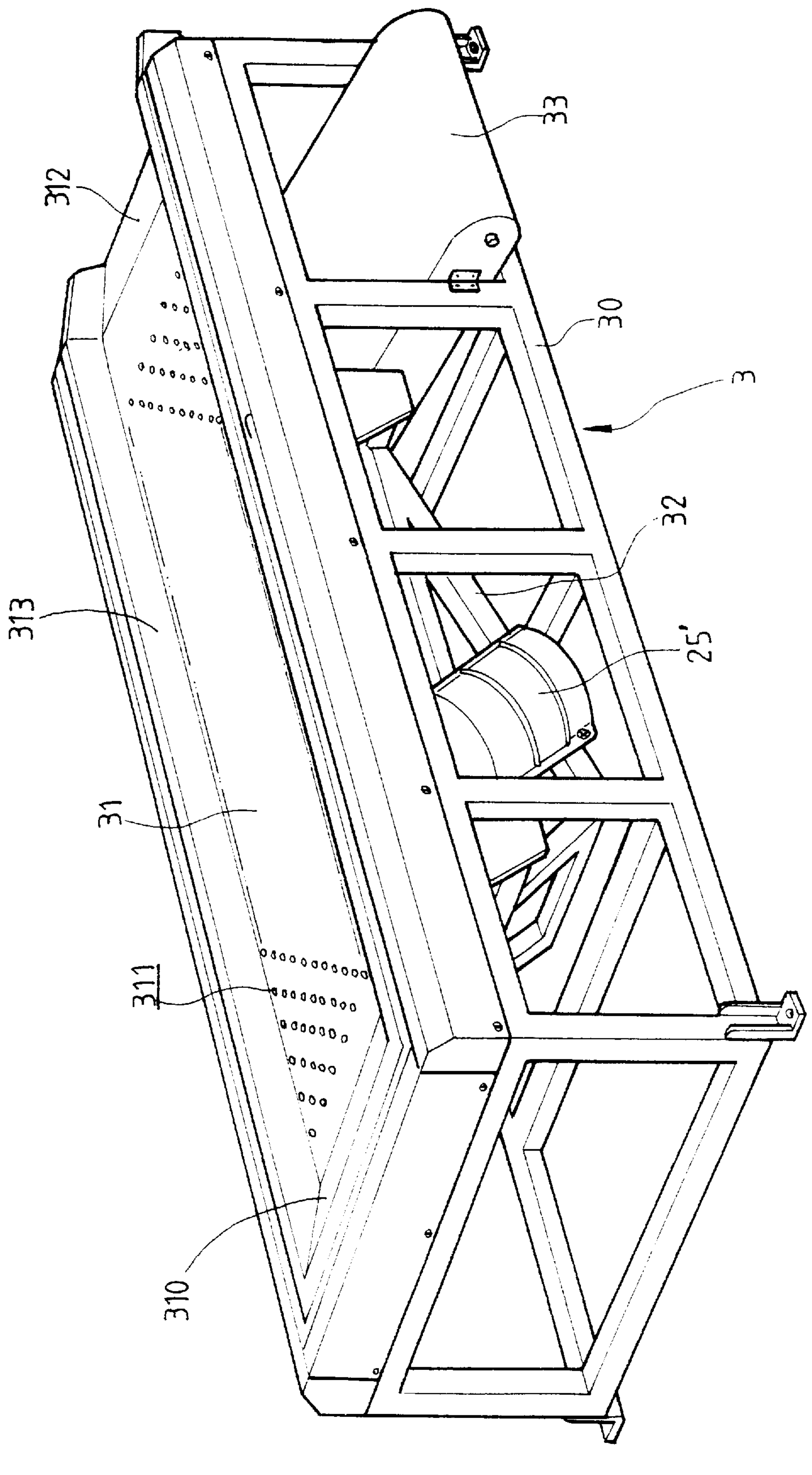
FIG. 5 is a perspective view showing the vibration separating section of the bean sprout processing apparatus of the present invention.
Figure 6:
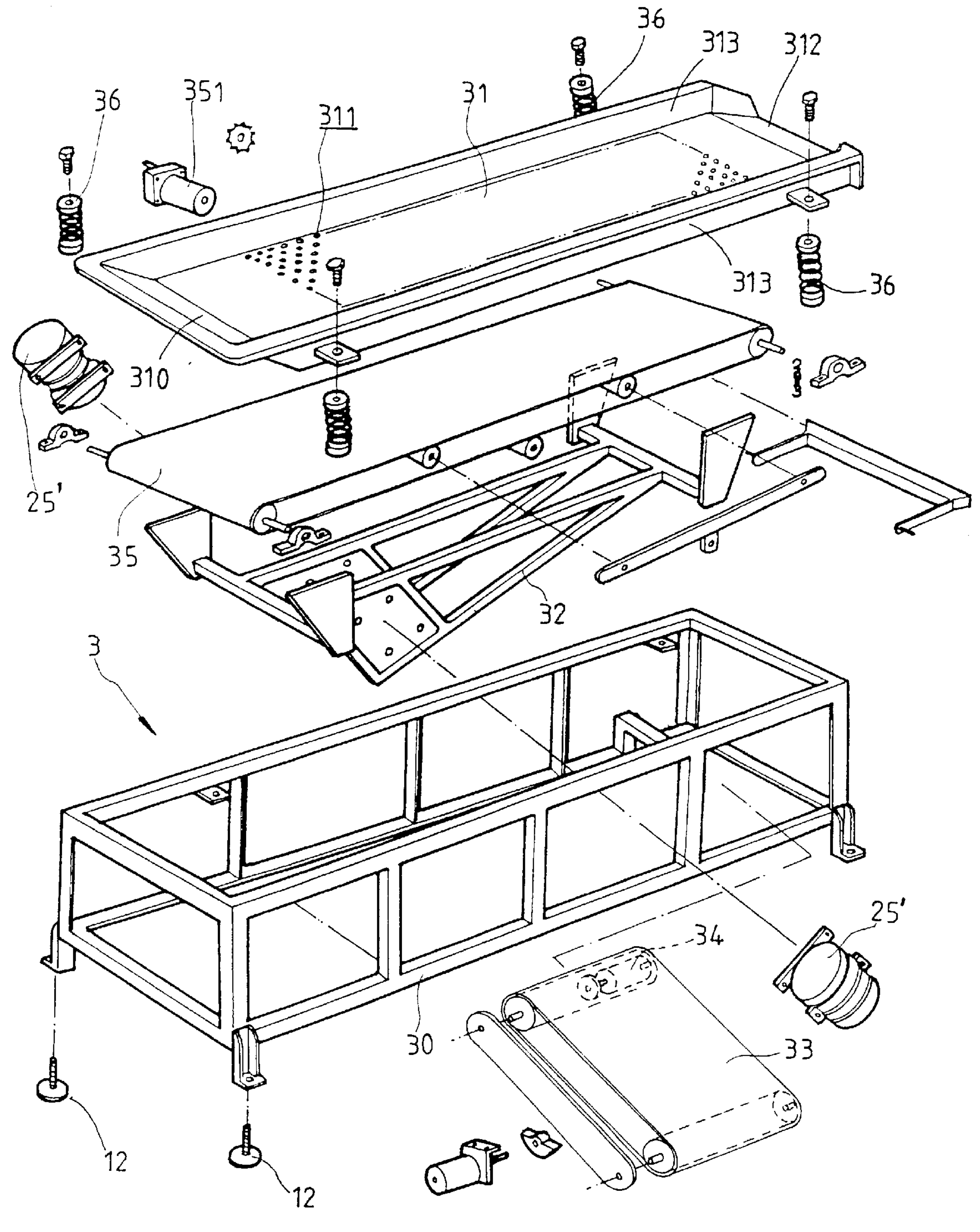
FIG. 6 is an exploded perspective view of the vibration separating section.

Referring to FIGS. 5 and 6, the vibration separating section 3 of the bean sprout processing apparatus, which is located downstream of the husk removing and root breaking section 2, comprises a base frame 30 having reciprocally movably supported thereon a movable frame 32 by means of resilient means, such as four springs 36 located at four corners of the movable frame 32. Eccentric vibration or shaking means, such as two eccentric motors 25', are provided on the movable frame 32 to make the movable frame 32 to vibrate or oscillate. Preferably, the movable frame 32 is constructed as an un-equilateral triangle to make the gravity center thereof offset from the geometrical center thereof, defining an un-balanced gravity center, so that by the operation of the eccentric motors 25', the movable frame 32 vibrates or oscillates.

A sprout support plate 31 is fixed on the movable frame 32 to be moved thereby when the eccentric motors 25' are operating. The sprout support plate 31 is substantially at a height slightly lower than the sprout tray 26 of the husk removing and root breaking section 2 and has an inclination 310 extending toward the sprout tray 26 to cooperate the exit inclination 262 of the sprout tray 26 and thus receive the sprouts therefrom.

The sprout support plate 31 has a plurality of apertures 311 formed thereon, preferably uniformly distributed, to allow the husks that are separated from the sprouts and the broken roots of the sprouts to pass downward therethrough when the sprout support plate 31 is vibrated by the movable frame 32. A conveyor system is arranged below the sprout support plate 31 to receive and move the husks and broken roots of the sprouts thereon out of the bean sprout processing apparatus. The conveyor system comprises a primary belt conveyor 35 coextensive with the sprout support plate 31 and driven by a motor 351 to receive and move the husks and broken roots of the sprouts toward a secondary belt conveyor 33 which is driven by a motor 34 to move the husks and broken roots to a waste collection container (not shown).

Due to the vibration of the sprout support plate 31 caused by the operation of the eccentric motors 25', the processed sprouts are forced to move along the sprout support plate 31 toward an exit, preferably with a downward inclination 312 formed thereon, to be collected at a collection station (not shown). The sprout support plate 31 may be provided with side walls 313 along two opposite sides thereof to prevent the sprouts from falling out of the sprout support plate 31 and to guide the sprouts toward the exit inclination 312.

In operation, an operator may dump un-processed bean sprouts into the receptacle 11 of the feeding section 1 and the un-processed bean sprouts are conveyed upward to the entrance inclination 261 of the sprout tray 26 to allow the un-processed bean sprouts to enter the husk removing and root breaking section 2. The shaking of the sprout tray 26 caused by the eccentric motors 25 separates the husks from the bean sprouts and breaks the roots of the sprouts and also moves the so processed sprouts toward the vibration separating section 3. At the same time when the sprouts are moved toward the vibration separating section 3, a low temperature air stream generated by the cooling source 22 is conducted to the sprout tray 26 to lower the temperature of the sprouts to preferably approximately 3°–5° C.

The so processed bean sprouts, together with the separated husks and the broken roots, are moved into the sprout support plate 31 of the vibration separating section 3 through the exit inclination 262 of the sprout tray 26 and the entrance inclination 310 of the sprout support plate 31. The vibration of the sprout support tray 31 makes the sprouts moved toward the exit inclination 312 of the sprout support plate 31 and have the husks and broken roots to fall through the apertures 311 formed on the sprout support plate 31 so as to separate the husks and the broken roots from the processed sprouts. The so processed sprouts are then moved thought the exit inclination 312 and collected.

The bean sprout processing apparatus so constructed in accordance with the present invention has a working capacity of approximately four (4) tons per hour which is about twice of that of the vertical type bean sprout processing apparatus and more than twice of that of the drum type bean sprout processing device discussed hereinabove.

Quite obviously, the bean sprout processing apparatus disclosed herein does not need to consume a great amount of water in processing the bean sprouts and since the beans sprouts are not wetted during the processing operation, the preservation of the bean sprout may be improved. Further, with the temperature of the bean sprouts being lowered down to the range of 3°–5° C., the preservation of the bean sprouts is further improved.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A bean sprouts processing apparatus comprising a feeding section, a treating section and a separating section arranged in sequence substantially in a horizontal manner, wherein:

the feeding section comprises a receptacle for receiving un-processed bean spouts therein and conveyor means for conveying the bean sprouts toward the treating section;

the treating section comprising a sprout tray movably supported on a base, shaking means being provided between the sprout tray and the base to shake the sprout tray relative to the base so as to separate husks from the sprouts and to break roots of the sprouts and also move the sprouts and the separated husks and broken roots toward the separating section; and the separating section comprises a sprout support plate movably supported on a base to receive the sprouts from the treating section, the sprout support plate comprising a plurality of apertures formed thereon, and vibration means arranged between the base and the sprout support frame to vibrate the sprout support plate relative to the base so as to cause the husks and broken roots to fall through the apertures and thus separated from the sprouts.

2. The apparatus as claimed in claim 1, wherein the treating section further comprises cooling means which generates an air stream of a predetermined low temperature and distributor means to distribute the low temperature air stream to the bean sprouts on the sprout tray.

3. The apparatus as claimed in claim 2, wherein the predetermined low temperature is in the range of 3°–5° C.

4. The apparatus as claimed in claim 1, wherein the separating section further comprises a conveyor system located below and co-extensive with the sprout support plate to receive and convey the husks and the broken roots falling through the apertures of the sprout support plate to a waste collector.

5. The apparatus as claimed in claim 1, wherein the shaking means of the treating section comprises a shaking frame movably supported on the base of the treating section with resilient means and having an un-balanced gravity center, at least one eccentric motor being provided on the shaking frame so as to cause the shaking frame to shake relative to the base.

6. The apparatus as claimed in claim 5, wherein the resilient means comprises springs.

7. The apparatus as claimed in claim 5, wherein the shaking frame has an un-equilateral triangular configuration.

8. The apparatus as claimed in claim 1, wherein the vibration means of the separating section comprises a movable frame movably supported on the base of the separating section with resilient means and having an un-balanced gravity center, at least one eccentric motor being provided on the movable frame so as to cause the movable frame to vibrate relative to the base.

9. The apparatus as claimed in claim 8, wherein the resilient means comprises springs.

10. The apparatus as claimed in claim 8, wherein the movable frame has an un-equilateral triangular configuration.

11. The apparatus as claimed in claim 1, wherein the sprout tray of the treating section further comprises a cover member openably covering the sprout tray.

12. The apparatus as claimed in claim 2, wherein the sprout tray of the treating section further comprises a cover member openably covering the sprout tray.

* * * * *